(12) United States Patent
Mills

(10) Patent No.: US 6,575,286 B1
(45) Date of Patent: Jun. 10, 2003

(54) POP-UP MAIL TRAY STOP FOR CONVEYOR

(75) Inventor: Shane Mills, Nichols, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/850,601

(22) Filed: May 7, 2001

Related U.S. Application Data

(60) Provisional application No. 60/203,594, filed on May 12, 2000.

(51) Int. Cl.$^7$ .............................................. B65G 13/00
(52) U.S. Cl. ...................... 193/35 A; 193/35 G; 193/40
(58) Field of Search ............................ 193/35 A, 35 G, 193/40; 198/782

(56) References Cited

U.S. PATENT DOCUMENTS

| | | | | |
|---|---|---|---|---|
| 1,418,024 A | * | 5/1922 | Rider | 193/35 A |
| 2,297,330 A | * | 9/1942 | Schoepfer | 193/35 G |
| 2,306,101 A | * | 12/1942 | Van Zandt | 193/40 |
| 2,345,415 A | * | 3/1944 | Nagy, Jr. | 193/35 A |
| 2,980,222 A | * | 4/1961 | Crosby | 193/35 A |
| 3,621,982 A | * | 11/1971 | Fleischauer | 198/127 |
| 3,819,023 A | * | 6/1974 | McClelland | 193/40 |
| 3,830,409 A | * | 8/1974 | Jenkinson | 221/236 |
| 3,901,378 A | * | 8/1975 | Rolland | 193/35 A |
| 3,970,180 A | | 7/1976 | Schlottmann et al. | |
| 4,000,796 A | * | 1/1977 | Bolton et al. | 193/35 A |
| 4,219,115 A | * | 8/1980 | Moore | 198/781 |
| 4,397,386 A | | 8/1983 | Kampf | |
| 4,662,500 A | | 5/1987 | Agnew | |
| 4,798,282 A | | 1/1989 | Sperduti et al. | |
| 5,207,313 A | * | 5/1993 | Gebhardt | 198/780 |
| 5,211,276 A | | 5/1993 | Clopton | |
| 6,220,418 B1 | * | 4/2001 | Moradians | 193/35 A |

* cited by examiner

Primary Examiner—Douglas Hess
(74) Attorney, Agent, or Firm—Perkins, Smith & Cohen, LLP; Harvey Kaye; Jacob N. Erlich

(57) ABSTRACT

A conveying system having a plurality of rotating rollers forming a horizontal drive path for moving articles and at least one pop-up stop for stopping movement of articles in such path. A pair of levers are mounted for rotation about a pivot to move one lever arm of each of the pair of levers above and below the horizontal path and thus move one of the rollers above the path in a position to stop articles on the conveyor. There is a pair of rollers mounted for rotation in the horizontal path on one lever arm of each of pair of levers. A pneumatic actuator is connected to at least one of the levers for moving the pair of levers about the pivot thereby to move one of the rollers to a position above the horizontal path.

12 Claims, 4 Drawing Sheets

POP-UP MAIL TRAY STOP FOR CONVEYOR

CROSS-REFERENCE TO RELATED APPLICATIONS

This application is based upon and claims the benefit of application Ser. No. 60/203,594 filed May 12, 2000.

FIELD OF THE INVENTION

The present invention relates generally to the conveying art, and, more particularly, to a pop-up stop to halt articles moving on a conveying system.

BACKGROUND OF THE INVENTION

Articles, such as mail trays traveling down a conveyor line need to be acted upon in a variety of different ways by various machines and processes. Trays need to be controlled, diverted, tracked or stopped for accumulation in a reliable, repeatable way. Previous designs take up excessive amounts of footprint, are expensive and mechanically intense.

In the past the problem was attempted to be solved using large mechanisms which are mechanically intense. The very nature of the designs drives the cost and the size of the mechanism up. Some of these designs use blades activated by air cylinders that "pop-up" between the conveyor rollers to stop articles on the conveyor. There are always interference, clearance and cost issues associated with these designs. One design uses a thruster type air cylinder to provide the vertical motion needed to stop a package and also to withstand substantial side loads. Another design uses plastic slides that guide a metal flag up vertically to stop a mail tray. The present design uses a smaller air cylinder.

U.S. Pat. No. 3,970,180 discloses a flat stop element having a positive latch mechanism to hold the stop in the raised position and a solenoid to release the latch. A spring return mechanism raises the stop and re-engages the latch when the solenoid is de-energized.

U.S. Pat. No. 4,397,386 discloses a stop for a conveyor which is a pin or plunger and is concerned with removing frictional resistance to retraction of the stop member. The present invention does not require this since it has no such frictional resistance to retraction.

U.S. Pat. No. 4,662,500 discloses a can conveyor stop which enters the conveyor from the side and uses a spring to bias the stop into its retracted position.

U.S. Pat. No. 4,798,282 discloses a zone conveyor which may have one of three different types of article stops. The first is a gate which is raised above the conveying plane to stop articles. The second is a notched disc which is fixed to a roller, and when it is desired to stop articles a pin is moved into one of the notches to stop the roller. A third is a belt which surrounds two adjacent drive rollers. When it is desired to stop an article, the belt is tightened around the two rollers so that they cannot rotate.

U.S. Pat. No. 5,211,276 discloses a stop which acts on a special projection of pallets moving on the conveyor. A complicated cam mechanism is used to move a stop element into the path of the projection to stop movement of the pallet.

SUMMARY OF THE INVENTION

It is an object of the present invention to provide a simple, inexpensive device which will stop articles on a conveyor in an accurate and repeatable manner.

It is another object of the present invention to provide such a device which does this less expensively than competitive devices.

A further object of the present invention is to provide such a device with a robust mechanical design and robust control arrangement.

Still another object of the present invention is to provide such a device which can be retrofit onto existing conveyors.

These and other objects of the present invention are accomplished by a mechanism which is better than the prior art because it is actually integral to the conveyor and uses conveyor rollers which minimizes part count and increases reliability. This costs less, is easier to maintain, and is packaged as efficiently as possible to save space.

Articles moving in a straight line along an accumulating conveyor line need to be acted upon in different ways for diversion into different conveyor streams. This mechanism provides the repeatable registration surface for article diversion. It has a fast cycle time, minimal impact to space limitations within conveyor designs, simplicity of design, very inexpensive compared to current design, will enhance conveyor system performance and it is easy to retro-fit to existing systems.

When the stop is released the articles are touching the roller which begins to rotate as soon as there is any friction between them, so that special retraction resistance measures are not needed as in the prior art.

The present invention is an integral part of an article or mail tray conveyor and conveyor rollers which minimizes the number of different parts required and increases reliability. This is achieved by actually making a down stream idler roller become the stopping mechanism. The stopping roller pivots up to a 90 degree angle in order to stop incoming trays. The upstream roller to the pop-up roller acts as the pivot center. The linkage that allows this motion to take place is designed in such a way that it does the following: it critically constrains the pop-up idler roller, it pivots around the upstream slave roller center and is connected to an air cylinder at the other end to provide the force and motion. A bracing bar connects the linkages to one another on both sides of the conveyor. This bracing bar provides the rigidity needed for the linkage to swing through its arc. The bracing bar extends through the conveyor side wall where it is connected to the air cylinder shaft. The air cylinder is packaged in the side wall "C" channel of the conveyor. The air cylinder is a double acting type to provide fast cycle times. The packaging allows for a cleaner, more efficient and cost effective design.

The pop-up stop is used to momentarily stop articles moving along an accumulation conveyor in order to register them at a repeatable location. The stopping mechanism is an integral part of the conveyor rollers.

An existing problem is that articles moving in a straight line along an accumulating conveyor line need to be acted upon in different ways for diversion into different conveyor streams. The mechanism of the present invention provides the repeatable registration surface for article diversion.

The present invention provides a mail pop-up stop design that is more cost effective and takes up less space than prior art devices. The pop-up roller pivots to a 90 degree position.

The design is of sheet metal linkage arms, a plastic bearing, a bracing shaft, an air cylinder and a conveyor roller. This assembly is packaged neatly in the side wall of "C" channel conveyor.

Some of the benefits of the present invention are: fast cycle time, minimal impact to space limitations within conveyor designs, simplicity of design, low cost (very inexpensive compared to current designs), enhances conveyor system performance, and is easy to retro-fit into existing systems.

The design of the pop-up stop allows it to be easily retrofit into existing conveyors. It is constructed using rotating rollers which are similar to those forming the conveyor path, and actually includes two such rollers as part of the stop.

The means by which the foregoing objects and features of invention, as well as others, are achieved are pointed out in the claims forming the concluding portion of the specification. The invention, both as to its organization and manner of operation, may be further understood by reference to the following description taken in connection with the following drawings.

DETAILED DESCRIPTION OF THE PREFERRED EMBODIMENTS

The present invention provides a pop-up stop for an article conveying system. It is also an improvement in a conveying system having a plurality of rotating rollers forming a horizontal drive path for moving articles and at least one pop-up stop for stopping movement of articles in the path. It further also provides a pop-up stop which may be retrofit into existing conveyor systems.

Figure 1:
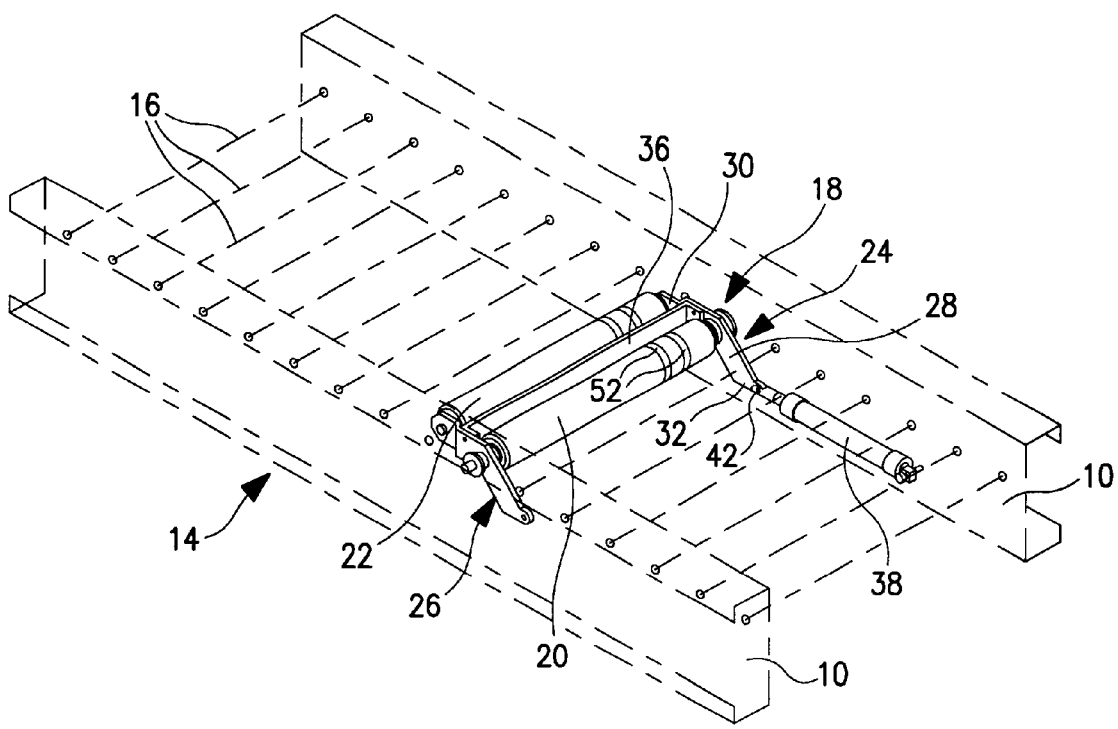
FIG. 1 is a schematic isometric view of a section of the conveyor which includes the pop-up stop of the present invention.
Figure 2:
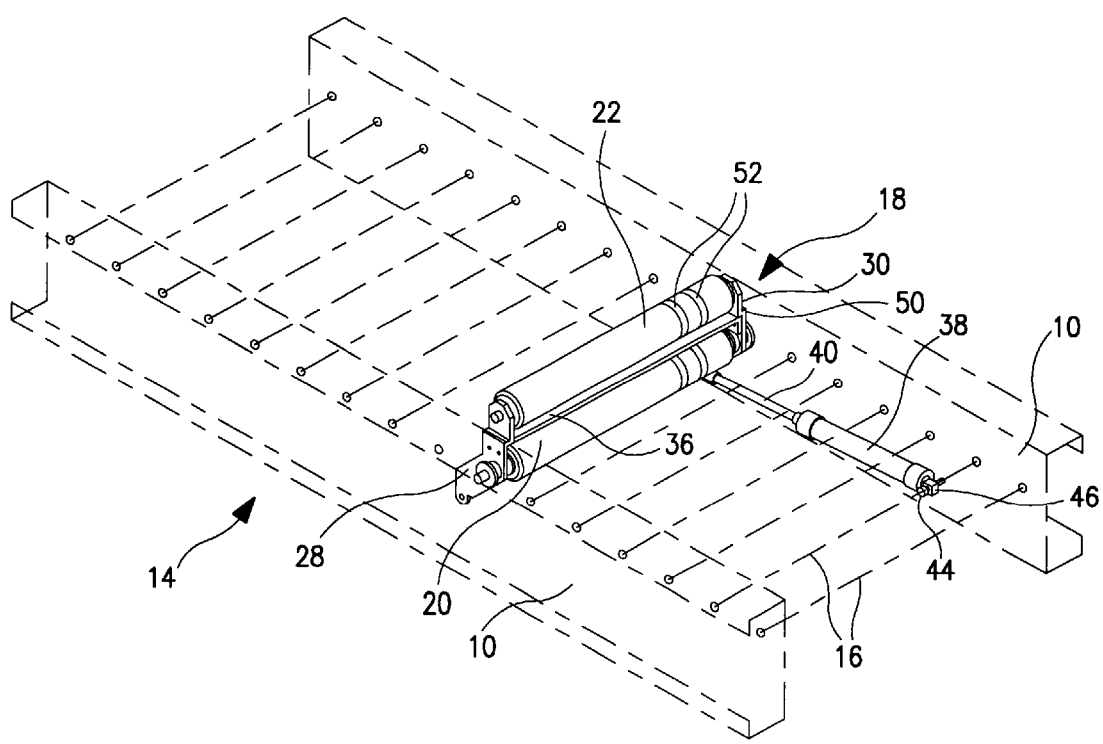
FIG. 2 is a schematic isometric view similar to FIG. 1 showing the stop in its operated position for stopping articles.
Figure 3:
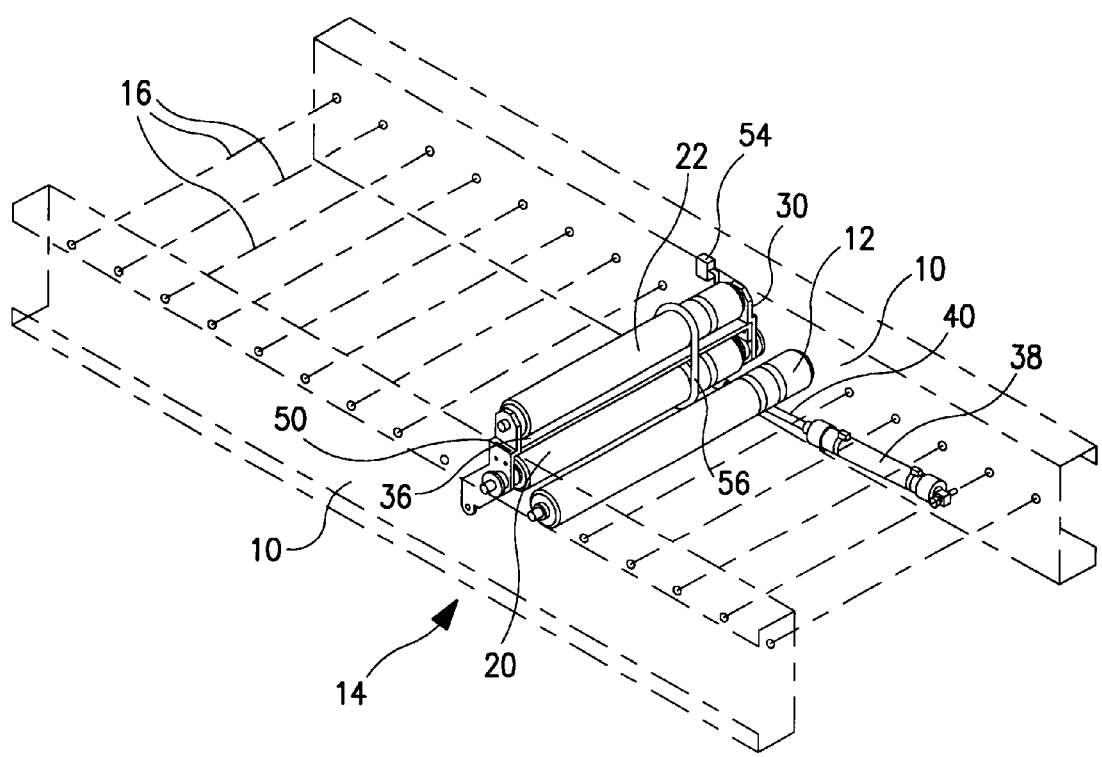
FIG. 3 is a schematic isometric view similar to FIG. 2 showing the drive belt on the two rollers of the stop as well as one of the regular rollers which form the conveyor.

FIGS. 1–3 show the two C shaped side rails 10 into which the rollers 12 forming the conveyor 14 are journaled. Only one such roller 12 is shown. For clarity only the axes 16 of the other rollers are indicated. Adjacent rollers are connected together so that every roller does not need to be a drive roller but rather every tenth roller, for example, can be a drive roller. If desired, there can be nine driven rollers upstream of the drive roller and nine driven rollers downstream of the drive roller. The idler rollers are connected to the drive rollers by bands or O-rings which are wound around the edges of the rollers. The rollers form a horizontal drive path for the articles, such as mail trays, to move down the conveyor along the upper surfaces of the conveyor rollers.

Since there are sorting procedures involved, it is periodically necessary to stop the movement of the articles in a repeatable way so that the actual point of stopping an article can be a registration point for the further processing of mail such as moving articles into an adjacent path or into a side bin.

The novel stop or pop-up stop 18 of the present invention is shown in all figures. The stop in FIG. 1 is shown in its position in which articles are moved over the upper surfaces of the rollers. Two adjacent rollers 20 and 22, which are the pivot point roller and stop roller, respectively, are shown, both being mounted into a pair of lever of arms 24 and 26. There is a bracing bar 36 which connects the levers 24 and 26 at a point between rollers 20 and 22. Each lever has lever arms 28 and 30 on opposite sides from the pivot point. The end of lever arm 28 has an extension 32 with a hole 34 in it.

The levers have a pivot point at roller 20 so than when the levers move about the pivot point, the roller 22 is moved in an arc about the adjacent roller. The arc may be 90 degrees, for example.

Lever arm 30 has a bend 50 to accommodate the pop-up roller 22 which is slightly shorter than the other rollers 20 and 12. The rollers 12, 20 and 22 are mounted in roller bearings 48, the rollers 12 and 20 being mounted to the rails 10 and the pop-up or stop roller 22 being mounted to the lever arm 30.

A small air cylinder 38 having a shaft 40 is mounted under the rollers and to the opening 34 in lever arm extension 32 by a connection 42. A pivot pin 44 is mounted to one rail 10 and a bearing 46 on air cylinder 38 allows any small amount of rotation of the air cylinder 38 about the pivot pin 44 which may be needed. When the air cylinder 38 is actuated it pivots the pop-up stop roller 22 about the adjacent pivot roller 20. FIG. 2 shows the same rollers as are shown in FIG. 1. However in this position it can be seen that the air cylinder 38 has been extended and the lever arm 28 has been moved by pivoting about roller 20. The pop-up or stop roller 22 is shown in an upper position above the horizontal upper surface of the row of rollers which form the upper conveyor surface on which the articles move.

Figure 4:
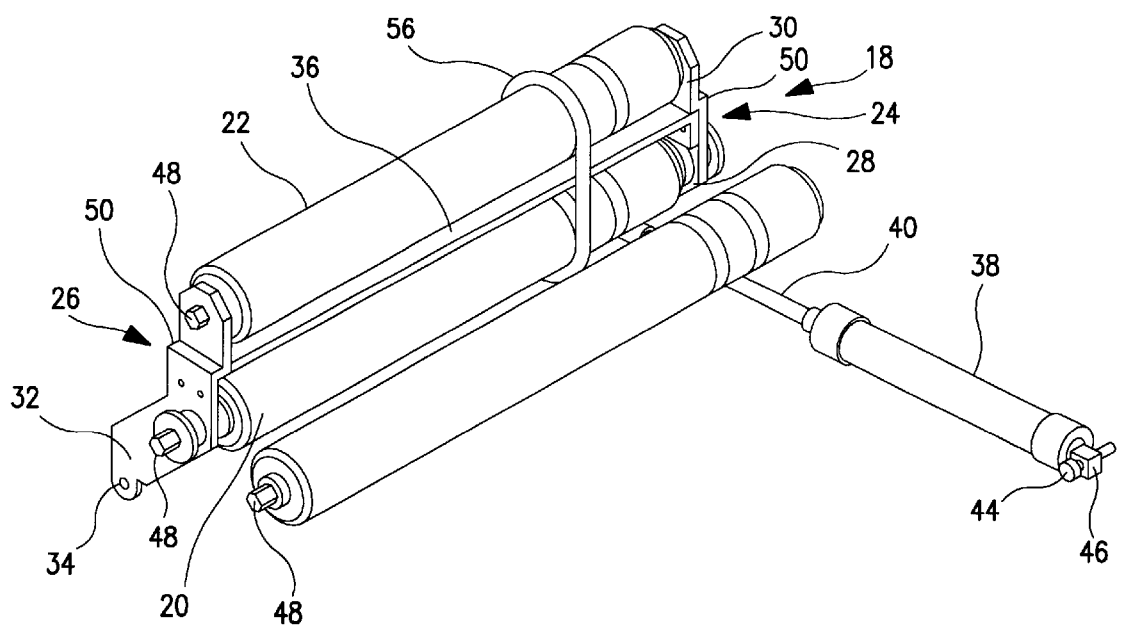
FIG. 4 is a detail view showing the pop-up stop mechanism and an additional roller.

FIGS. 3 and 4 show a regular conveyor roller 12 and also shows the drive belts 56 which connects rollers 20 and 22, via the grooves 52 in the rollers. These rollers are driven by upstream rollers via a series of such belts running in the grooves 52. Each intermediate roller has two belts; one which drives the roller from an upstream adjacent roller, and the other belt which drives the downstream adjacent roller. Thus, the pop-up roller is still driven by upstream power sources as a result of this belted design so that it is still a functioning part of the conveying mechanism. A sensor 54 is shown on one side of the C frame which detects the position of the pop-up stop roller, i.e., whether it is up or down. Other sensors and tracking software are used to sense articles moving down the conveyor to determine their position on the conveyor, and such sensors may be used to control the pop-up roller stop of the present invention.

The levers can be made of sheet metal and the bearings can be of plastic.

Thus, the present invention provides a stop as part of a conveying system which includes a plurality of rotating rollers forming a horizontal drive path for moving articles. The stop is a pop-up type which includes two rotating rollers mounted on a pair of levers mounted for rotation about a pivot to move one lever arm of each of the pair of levers above and below the horizontal path. The lever arm is below the path during normal operation of the conveyor and above the path when it is desired to stop an article moving along the path. A pneumatic actuator is connected to at least one of the levers for moving the levers about the pivot to move one of the rollers to a position above the horizontal path where it stops articles moving therealong.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. In a pop-up stop in a horizontal driven roller article conveying system, the improvement comprising:
   a. a pair of levers mounted for rotation about a pivot to move one lever arm of each of said pair of levers above and below a horizontal plane;

b. a pair of rollers mounted for rotation in said horizontal plane on said one lever arm of each of said pair of levers; and c. a pneumatic actuator connected to at least one of said levers for moving the pair of levers about said pivot thereby to move one of the rollers from its normal position no higher than the horizontal plane to a position above said horizontal plane thereby stopping articles on the conveying system.

2. A pop-up stop as defined in claim 1 wherein one of said rollers is a stop roller which contacts and stops articles on the conveying system.

3. A pop-up stop as defined in claim 2 wherein the axis of the other roller of said pair of rollers is also the axis of said pivot.

4. A pop-up stop comprising:

a. a pair of levers mounted for rotation about a pivot to move one lever arm of each of said pair of levers above and below a horizontal plane;

b. a pair of rollers mounted for rotation in said horizontal plane on said one lever arm of each of said pair of levers, said pair of rollers being drivingly connected by a drive belt, one of said rollers being a stop roller which contacts and stops articles on the conveying system the axis of the other roller of said pair of rollers also being the axis of said pivot; and c. a pneumatic actuator connected to at least one of said levers for moving the pair of levers about said pivot thereby to move one of the rollers to a position above said horizontal plane.

5. A conveying system having a plurality of rotating rollers forming a horizontal drive path for moving articles and at least one pop-up stop for stopping movement of articles in said path, the improvement comprising:

a. a pair of levers mounted for rotation about a pivot to move one lever arm of each of said pair of levers above and below the horizontal path;

b. a pair of rollers mounted for rotation in said horizontal path on said one lever arm of each of said pair of levers, one of said rollers being a stop roller which contacts and stops articles on the conveying system, the axis of the other roller of said pair of rollers also being the axis of said pivot, said pair of rollers being drivingly connected by a drive belt; and c. a pneumatic actuator connected to at least one of said levers for moving the pair of levers about said pivot thereby to move one of the rollers to a position above said horizontal path.

6. A conveying system as defined in claim 5 wherein the rollers forming the conveying system are driven from a belt on an adjacent upstream roller and drive an adjacent downstream roller via a belt.

7. A conveying system as defined in claim 6 wherein said other roller is driven by the adjacent upstream roller via a belt.

8. A retrofit stop assembly for a conveying system having a conveying path in a plane, comprising:

a. a pair of levers mountable for rotation about a pivot to move one lever arm of each of said pair of levers above and below said plane;

b. a pair of driven rollers mounted for rotation in said plane on said one lever arm of each of said pair of levers; and c. an actuator connected to at least one of said levers for moving the pair of levers about said pivot thereby to move one of the rollers from its normal position no higher than the plane to a position above said plane thereby to stop articles being moved along said plane.

9. A retrofit stop assembly as defined in claim 8 wherein said one roller is the stop roller which is intended to contact and stop articles on a conveying system.

10. A retrofit stop assembly as defined in claim 9 wherein the axis of the other roller of said pair of rollers is also the axis of said pivot.

11. A retrofit stop assembly for a conveying system, comprising:

a. a pair of levers mountable for rotation about a pivot to move one lever arm of each of said pair of levers above and below a horizontal plane;

b. a pair of rollers mounted for rotation in said horizontal plane on said one lever arm of each of said pair of levers, one of said rollers being a stop roller which is intended to contact and stop articles on a conveying system, the axis of the other roller of said pair of rollers also being the axis of said pivot, said pair of rollers being drivingly connected by a drive belt; and c. a pneumatic actuator connected to at least one of said levers for moving the pair of levers about said pivot thereby to move one of the rollers to a position above said horizontal plane.

12. An assembly as defined in claim 8, further comprising a sensor for detecting the position of the roller which moves above the plane.

\* \* \* \* \*